United States Patent Office 3,173,921
Patented Mar. 16, 1965

3,173,921
5-DINITROMETHYLTETRAZOLE AND SALTS THEREOF
Fred J. Einberg, Philadelphia County, Pa., assignor to the United States of America as represented by the Secretary of the Army
No Drawing. Filed Mar. 27, 1963, Ser. No. 268,500
3 Claims. (Cl. 260—299)
(Granted under Title 35, U.S. Code (1952), sec. 266)

The invention described herein may be manufactured and used by or for the Government for governmental purposes without the payment to me of any royalty thereon.

The present invention relates to a new chemical compound identified as 5-dinitromethyltetrazole of the formula

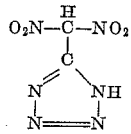

and to highly advantageous methods by which it may be produced.

The new compound of my invention has unique and worthy properties which make it valuable for explosives, propellants, gas generants for gas activated devices and the like. It is a high energy compound having an oxygen balance to carbon dioxide and water of 92%. Thus, 92% of the oxygen required for converting the carbon and hydrogen of the compound to carbon dioxide and water is available internally. When related to carbon monoxide and water, the oxygen balance is doubled, or 184%. A significant aspect therefore of my compound is that upon combustion thereof, the compound may be completely converted to a gas and yet 42% of the oxygen within the compound would be available for oxidation of another material, such as fuel in a rocket propellant.

In producing my new compound, 15.3 grams (0.1 mole) of sodium dinitroacetonitrile, 6.65 gms. (0.102 mole) of sodium azide, and 5.50 gms. (0.102 mole) of ammonium chloride were dissolved in a round bottom flask containing 40 to 60 ml. of distilled water, the aim being 50 ml.

A condenser was connected to the flask and the solution therein was refluxed with magnetic stirring for 24 hours. The solution then was cooled to room temperature and made acidic with concentrated hydrochloric acid to a pH of less than 1.0. Hydrazoic acid, formed by the reaction of sodium azide and hydrochloric acid, was removed under reduced pressure by water aspiration. The original water of the solution was then removed under aspiration on a steam bath. The dry product, after removal of the water and hydrazoic acid, was extracted with acetone and filtered to remove inorganic salt. The acetone filtrate was evaporated and the solid was extracted with several hundred mls. of boiling ethyl ether. The ether solution contained the 5-dinitromethyltetrazole product and the ether insoluble solid was the unreacted dinitroacetonitrile salt.

The reaction may be characterized as follows:

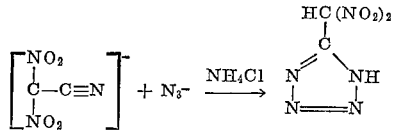

A yield of 2.5 grams, 14.4% of theoretical, of crude 5-dinitromethyltetrazole was obtained from the 24 hour reaction mixture.

The preparation was conducted using half the molar quantities of reactants in a 48 hour reaction. The resultant yield of 1.3 grams, 14.9% of theoretical, of crude 5-dinitromethyltetrazole represented a percentage increase of 0.5% over the yield from the 24 hour reaction.

The quantities of crude 5-dinitromethyltetrazole produced in the foregoing 24 and 48 hour reactions were purified by dissolution in methyl alcohol and recrystallization therefrom, the yields being 1.4 grams and 0.77 gram, respectively, of white crystalline 5-dinitromethyltetrazole. 11.3 gms., 76% of theoretical and 5.2 gms., 70.3% of theoretical, of ammonium dinitroacetonitrile based on starting moles of sodium dinitroacetonitrile were recovered from the 24 and 48 hour reactions, respectively, as were small quantities of unreacted sodium dinitroacetonitrile. On cooling the reaction mixture to 5° C. (before acidification) a substance identified as the diammonium salt of bis (5,5'-tetrazolyl) was precipitated. The yield was 0.6 gram, 7.0% of theoretical and 0.9 gram, 21% of theoretical based on 2 moles of dinitroacetonitrile salt being required to produce one mole of diammonium bis (5,5'-tetrazolyl) from the 24 and 48 hour reactions, respectively. Cold water washing and recrystallization thereof from water resulted in the obtention of glistening white needles.

My new compound also was produced by dissolving, 7.40 gms. (0.050 mole) of ammonium dinitroacetonitrile, 3.33 gms. (0.051 mole) of sodium azide, and 2.75 gms. (0.051 mole) of ammonium chloride in 20 to 30 ml. of distilled water, the aim being about 25 ml., in a round bottom flask. A similar reaction mixture (0.05 mole) was refluxed 48 hours. Both reaction mixtures then were treated as described for the reactions with sodium dinitroacetonitrile except that the solid remaining after the ether extraction was not extracted with ethyl acetate.

The reaction refluxed 24 hours gave 2.06 gms., 23.7% yield of crude 5-dinitromethyltetrazole which after recrystallization from methyl alcohol yielded 1.07 gms., 12.3% of white, crystalline 5-dinitromethyltetrazole. A yield of 0.68 gm., 8% of diammonium bis-(5,5'-tetrazolyl) was obtained and 10.7 gms., 71.8% of unreacted ammonium dinitroacetonitrile was recovered from the 24 hour reaction. After 48 hours reflux, the reaction mixture gave 2.7 gms., 31.0% yield of crude 5-dinitromethyltetrazole which after recrystallization from methyl alcohol gave 0.8 gm., 9.2% yield of white, crystalline 5-dinitromethyltetrazole. A yield of 1.8 gms., 21.9% of diammonium bis-(5,5'-tetrazolyl) was obtained and the 2.64 gms., 35.2% of unreacted ammonium dinitroacetonitrile was recovered after 48 hours reaction.

Recrystallized diammonium salt of bis-(5,5'-tetrazolyl) revealed no melting up to 300° C., although discoloration started at about 270° C. In an open flame this compound carbonized without melting or flashing off. Chemical analyses, both actual and theoretical, are shown in Table I.

Table I

|  | Actual | Theoretical |
| --- | --- | --- |
| Carbon | 13.88 | 13.95 |
| Hydrogen | 4.95 | 4.65 |
| Nitrogen | 81.70 | 81.40 |

NOTE.—All values given in weight percent.

Conversion to the free acid was effected by dissolution of the diammonium salt in a minimum quantity of 10% aqueous HCl necessary to adjust the pH to less than a value of 1. Precipitation occurred on cooling to 5° C. and the free bis-(5,5'-tetrazolyl) acid was then filtered and purified by recrystallization from water.

Testing of the recrystallized free acid revealed a melting point of 255.0–255.5° C., melting being attended by decomposition. The free acid flashed off in an open flame.

A neutral equivalent value of 69.7, determined experimentally by titration using a pH meter, was found to compare favorably with the theoretical value of 69.0. As with the diammonium salt, chemical analysis was conducted, and actual values determined are compared with theoretical values in Table II.

*Table II*

|  | Actual | Theoretical |
|---|---|---|
| Carbon | 17.35 | 17.38 |
| Hydrogen | 1.48 | 1.45 |
| Nitrogen | 81.16 | 82.41 |

Note.—All values given in weight percent.

My new compound, 5-dinitromethyltetrazole, is stable at 25° C. When it is heated rapidly in a capillary tube to above 100° C. it discolors and produces nitrogen dioxide fumes and decomposes at 180° without melting. When crystals of 5-dinitromethyltetrazole are placed in an open flame, a brilliant flash occurs. The compound is a white, crystalline material that produces intense yellow solutions in polar solvents.

Chemical analysis of the new compound is shown in Table III.

*Table III*

|  | Actual | Theoretical |
|---|---|---|
| Carbon | 14.04 | 13.80 |
| Hydrogen | 1.24 | 1.16 |
| Nitrogen | 48.20 | 48.28 |

Note.—All values given in weight percent.

Further identification of my compound, 5-dinitromethyltetrazole, was obtained by use of varying methods. In one method, using a pH meter, the compound was titrated with 0.1 N sodium hydroxide. The titration curve revealed two end points, thus indicating a dibasic acid. The experimentally determined neutral equivalent was 87.7 as compared to the theoretical value of 87.0. The $pKa_1$ and $pKa_2$ were 1.45 and 3.60, respectively, showing the compound is a very strong, dibasic, organic acid.

Further evidence of the formation of a tetrazole was borne out by infrared spectra showing strong absorption peaks at 9.3, 9.5, 9.8, 10.0 microns. Tetrazoles generally absorb in the 9–10 micron wavelength region. Infrared absorption peaks at 6.3, 6.6 and 12.0 microns also showed the presence of the nitro groups.

Mono and dibasic salts of 5-dinitromethyltetrazole are prepared by titrating the aqueous free acid with base to the first or second end point. The water is removed by evaporation and the salts are recrystallized from alcohol or alcohol and water. Diammonium dinitromethyltetrazole decomposes at 190° without melting. It is a light, lemon yellow, crystalline solid. The mono-sodium salt is a crystalline solid, almost white in appearance which exploded violently when heated to 160° C. The di-sodium salt is a lemon yellow crystalline solid which neither melted nor decomposed when heated up to 310° C. Heavy metal salts of 5-dinitromethyltetrazole may be prepared by the addition of inorganic heavy metal salts to an aqueous solution of 5-dinitromethyltetrazole such as the addition of 10% aqueous silver nitrate. The precipitate is filtered, washed with water and air dried.

The guanidinium salt of 5-dinitromethyltetrazole was prepared by dissolving 0.05 gram of my compound and 0.07 gram guanidine carbonate in 2 ml. of distilled water and adjusting the pH to approximately 3.5. A precipitate formed immediately and was cooled at about 5° C. for about 1 hour and then filtered and washed with 2 ml. of cold, distilled water. Approximately 0.06 gram of the guanidinium salt was recovered and recrystallized from 2 ml. of distilled water which yielded shiny, yellow crystals. Elementary chemical analysis of the guanidinium salt is given in Table IV.

*Table IV*

|  | Actual | Theoretical |
|---|---|---|
| Carbon | 15.41 | 15.52 |
| Hydrogen | 3.47 | 2.61 |
| Nitrogen | 54.35 | 54.30 |

Note.—All values given in weight percent.

Having thus described my invention so that others skilled in the art may be able to understand and practice the same, I state that what I desire to secure by Letters Patent is defined in the following claims.

I claim:
1. 5-dinitromethyltetrazole of the formula

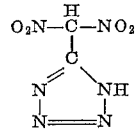

2. A salt of 5-dinitromethyltetrazole, said salt being a member of the group consisting of a mono-basic alkali metal salt, a di-basic alkali metal salt and an alkaline earth metal salt.

3. A silver salt of the compound of 5-dinitromethyltetrazole.

References Cited by the Examiner
UNITED STATES PATENTS
2,977,372   3/61   Finnegan et al. _____ 260—308

NICHOLAS S. RIZZO, *Primary Examiner.*